United States Patent [19]
Yasui et al.

[11] 3,876,721
[45] Apr. 8, 1975

[54] PROCESS FOR PRODUCING LIQUID POLYBUTADIENE

[75] Inventors: Seimei Yasui, Ibaraki; Takanobu Noguchi; Michio Yamamoto, both of Takatsuki; Yoshihara Yagi, Toyonaka, all of Osaka, Japan

[73] Assignee: Sumitomo Chemical Company, Limited, Osaka-shi, Osaku-fu, Japan

[22] Filed: July 3, 1973

[21] Appl. No.: 376,168

[30] Foreign Application Priority Data
July 5, 1972 Japan.............................. 47-67839

[52] U.S. Cl. .......................... 260/680 B; 252/431 R
[51] Int. Cl. ............................................... C08f 3/18
[58] Field of Search ................................. 260/680 B

[56] References Cited
UNITED STATES PATENTS
3,329,734  7/1967  Schleimer et al................... 260/680
3,428,699  2/1969  Schleimer........................... 260/669

Primary Examiner—Paul M. Coughlin, Jr.
Attorney, Agent, or Firm—Craig & Antonelli

[57] ABSTRACT

Process for producing liquid polybutadiene having predominantly cis-1,4-structure, which comprises polymerizing 1,3-butadiene in the presence of a novel catalyst system comprising 1. an organic aluminum compound of the formula: $AlR_1R_2R_3$ wherein $R_1$ is hydrogen, fluorine, alkyl cycloalkyl, aryl or aralkyl; $R_2$ and $R_3$ are each alkyl, cycloalkyl, aryl or aralkyl;

2. at least one of nickel compounds selected from the group consisting of
   a. a nickel salt of a carboxylic acid,
   b. an organic nickel complex compound,
   c. nickel tetracarbonyl, and
   d. $\pi$-bond type organic nickel compound; and 3. at least one of halogen-containing organic compounds selected from the group consisting of
   a. a halogenated aliphatic or alicyclic hydrocarbon,
   b. a benzotrihalogenide,
   c. an alkynyl halogenide, and
   d. a ketone compound containing chlorine or bromine in the molecule.

26 Claims, No Drawings

PROCESS FOR PRODUCING LIQUID POLYBUTADIENE

The present invention relates to a process for producing liquid polybutadiene. More particularly, it relates to a process for producing liquid polybutadiene having predominantly cis-1,4-structure by polymerization of butadiene in the presence of a novel catalyst system comprising (1) an organic aluminum compound, (2) a nickel compound and (3) a halogen-containing organic compound.

For production of liquid polybutadiene, there have, hitherto, been known various catalysts, such as butyl lithium, metal sodium and boron trifluoride. However, when such catalysts are used, the obtained liquid polybutadiene has predominantly vinyl- and trans-1,4-structure and 60 percent or less cis-1,4-structure.

Furthermore, there are described various other processes for the production of liquid polybutadiene in some literatures, for instance, a process by using a catalyst system comprising a halogenated alkyl aluminum, an organic nickel compound and a vinylcycloolefin in Japanese Patent Publication No. 13511/1969; a process for producing liquid polybutadiene having 70 percent or more cis-1,4-structure by using a catalyst system comprising a halogenated alkylaluminum, an organic nickel compound and an electron donative compound containing nitrogen, oxygen or the like in U.S. Pat. No. 3,428,699; a process by using a three-components catalyst system comprising an organic metal compound, a nickel compound and a halogen-containing inorganic compound in Japanese Pat. Opening No. 5645/1971; and a process by using a catalyst system comprising an organic aluminum compound of the formula: $R_mAlCl_n$ wherein $m + n = 3$, R is alkyl and Cl is chlorine, a nickel compound and a halogen-containing aromatic compound or a halogen-containing unsaturated hydrocarbon in U.S. Pat. No. 3,458,493.

It has been studied to find out a novel process for producing liquid polybutadiene having predominantly cis-1,4-structure, and then there has now been found a novel catalyst system valuable for te purpose.

The present invention provides a novel process for producing liquid polybutadiene having predominantly cis-1,4-structure, which comprises polymerizing 1,3-butadiene in the presence of a novel catalyst system comprising the following three components:

1. an organic aluminum compound having the formula: $AlR_1R_2R_3$ wherein $R_1$ is hydrogen, fluorine, alkyl, cycloalkyl, aryl or aralkyl; $R_2$ and $R_3$ are each alkyl, cycloalkyl, aryl or aralkyl;

2. at least one of nickel compounds selected from the group consisting of
   a. a nickel salt of a carboxylic acid,
   b. an organic nickel complex compound,
   c. nickel tetracarbonyl, and
   d. π-bond type organic nickel compound; and 3. at least one of halogen-containing organic compounds selected from the group consisting of
   a. a halogenated aliphatic or alicyclic hydrocarbon,
   b. a benzotrihalogenide,
   c. an alkynyl halogenide, and
   d. a ketone compound containing chlorine or bromine in the molecule.

According to the present invention, a low molecular weight polymer can be obtained regardless of the order of addition of the catalyst components. The polymerization speed is rapid and the polymerization is completed around 3 hours. When a dialkylaluminum fluoride is used as the organic aluminum compound, the polymerization speed is more rapid and the polymer having 4,000 or more molecular weight can be readily obtained. For producing a polymer having 4,000 or more molecular weight, it has been known to add water to the reaction system. However, according to such a method, gelation is promoted during the polymerization reaction, which is significantly disadvantageous for the industrial production. On the contrary, according to the present invention, such gelation is not observed when dialkylaluminum fluoride is used, even in case of production of high molecular polymer. Therefore, the present polymerization reaction can be advantageously carried out even in high concentration of the reaction system.

Furthermore, according to the present invention, a polymer having low molecular weight, e.g. 2,000 or less molecular weight can be advantageously produced. For producing a polymer having 2,000 or less molecular weight, it has been known to do the polymerization reaction under a condition of low polymerization activity. However, even by such method, a polymer having at lowest 1,500 of molecular weight is only obtained. There has never been known any process for producing a polybutadiene having less than 1,000 of molecular weight as the present invention.

The organic aluminum compound used as the component (1) in the present invention has the formula: $AlR_1R_2R_3$ wherein $R_1$ is hydrogen, fluorine, an alkyl, a cycloalkyl, an aryl or an aralkyl group; $R_2$ and $R_3$ are each an alkyl, a cycloalkyl, an aryl or an aralkyl group. The term "alkyl" means a straight or branched alkyl having 1 to 8 carbon atoms, such as methyl, ethyl, propyl, isopropyl, butyl, isobutyl, tert-butyl, pentyl, isopentyl, hexyl, heptyl, or octyl; the term "cycloalkyl" means a cycloalkyl having 3 to 7 carbon atoms, such as cyclopropyl, cyclobutyl, cyclopentyl, cyclohexyl, or cycloheptyl; the term "aryl" means an aryl, such as phenyl, o-tolyl, m-tolyl, p-tolyl, o-xylyl, m-xylyl, or p-xylyl; and the term "aralkyl" means an aralkyl, such as benzyl or phenethyl. As the suitable examples of the organic aluminum compound, there may be diethylaluminum hydride, di-n-propylaluminum hydride, di-n-butylaluminum hydride, diisobutylaluminum hydride, diphenylaluminum hydride, phenylethylaluminum hydride, dibenzylaluminum hydride, phenyl-n-propylaluminum hydride, p-tolyl-isopropylaluminum hydride, trimethylaluminum, triethylaluminum, tri-n-propylaluminum, triisopropylaluminum, tri-n-butylaluminum, triisobutylaluminum, tripentylaluminum, tricyclohexylaluminum, triphenylaluminum, diethylaluminum fluoride, di-n-propylaluminum fluoride, di-n-butylaluminum fluoride, diisobutylaluminum fluoride, dihexylaluminum fluoride, dioctylaluminum fluoride, diphenylaluminum fluoride, and the like.

As the suitable examples of the nickel salt of a carboxylic acid or the organic nickel complex compound used as the component (2), there may be a nickel salt of an organic carboxylic acid, such as nickel acetate, nickel naphthenate, nickel octate, or nickel benzoate; an organic nickel complex compound, such as complex of nickel chloride and pyridine, tris(dipyridine).nickel chloride, bis(ethylenediamine).nickel sulfate; and a chelate compound, such as bis(acetyl acetonate).nickel, bis(ethyl acetoacetate).nickel, and bis(dimethyl glyoximate).nickel. As the π-bond type organic nickel compounds, there may be, for instance, bis(π-allyl)nickel, bis(π-methallyl)nickel, bis(π-crotyl)nickel, bis(π-cyclooctenyl)nickel, and bis (π-cyclopentenyl)nickel.

Among the halogen-containing organic compounds of the component (3), as the halogenated aliphatic or alicyclic hydrocarbon (a), there may be, for instance, carbon tetrachloride, chloroform, bromoform, iodoform, dichloroethane, bromochloromethane, dibromoethane, diiodomethane, ethyl bromide, ethyl chloride, isobutyl chloride, isobutyl bromide, n-butyl bromide, tert-butyl bromide, tert-butyl chloride, 2-iodopropane, 2-bromodecane, 1,1,1-trichloroethane, 1,1,2-trichloroethane, pentachloroethane, hexachloroethane, 5-chloronorbornene, 5-chloromethylnorbornene, 5-bromonorbornene, and 5-bromomethylnorbornene. As the benzotrihalogenide (b), there may be, for instance, benzotrichloride, 2,4-dichlorobenzotrichloride, and benzotribromide. As the alkynyl halogenide (c), there may be, for instance, propargyl chloride, and propargyl bromide. And as the ketone compound containing chlorine or bromine in the molecule (d), there may be, for instance, 1,3-dichloroacetone, 1,1,3,3-tetrachloroacetone, bromoacetone, 1,3-dibromoacetone, and hexachloroacetone.

In the present process, the organic aluminum compound may be used in an amount of 0.0001 to 0.1 mol, preferably 0.0001 to 0.01 mol on the basis of one mol of butadiene monomer. The nickel compound may be used in an amount of 0.01 to 0.6 mol, preferably 0.05 to 0.25 mol on the basis of one mol of the organic alumium compound, and the halogencontaining organic compound may be used in an amount of 0.05 to 100 mol, preferably 0.2 to 20 mol on the basis of one mol of the organic aluminum compound.

In the present process, there may be used an inert solvent as a diluent of the catalyst and as a solvent for the polymerization reaction. As the inert solvent, there may be an aliphatic, alicyclic or aromatic hydrocarbon having 4 to 12 carbon atoms, for instance, butane. butene-1, butene-2, pentane, heptane, cyclohexane, benzene, toluene, xylene, and a mixture thereof. The inert solvent may be used in an amount of 0.3 to 10 times, preferably 0.5 to 3 times of the amount of butadiene monomer.

The polymerization reaction of the present invention is carried out in an atmosphere of an inert gas such as nitrogen or argon by using dry solvent and monomer. The polymerization by using of the present novel catalyst is usually carried out at a temperature of 0° to 100°C, preferably, 20° to 60°C. The polymerization pressure varies according to the polymerization temperature, and there is no specific limitation, but it is usually selected from the range of 1 to 10 atmospheres.

The butadiene monomer is added to the polymerization vessel in gaseous or liquid form and made contact with the catalyst. After the polymerization reaction, the reaction mixture is treated by a conventional method. The polymerization reaction and post-treatment can be carried out either batch system or continuous system.

The liquid polybutadiene produced by the present invention has 50 percent or more cis-1,4-structure which is confirmed by infrared analysis (Morero method). The present polybutadiene has intrinsic viscosity [η]: 0.05 to 0.6 dl/g, which is measured at 30°C in toluene solution by Ubbelohde's viscometer. The medium molecular weight of the polymer is measured at 37°C in benzene solution by a vapor pressure osmometer. The molecular weight of the polybutadiene can be controlled by the polymerization temperature, the concentration of the monomer, and the ratio of water and the catalyst.

When the present liquid polybutadiene having predominantly cis-1,4-structure is used in a paint composition, it shows excellent properties, such as excellent corrosion resistance, hardening velocity, epoxylation velocity and operability in comparison with natural oil and 1,2-vinyl type polybutadiene.

The present invention is illustrated by the following examples but not limited thereto.

EXAMPLE 1

Into a 200 ml glass made pressure bottle was added a solution of nickel naphthenate (0.02 mmol/ml) in toluene (2 ml) in nitrogen stream, and thereto was further added anhydrous toluene (90 ml). The mixture was cooled at −10°C and then liquefied butadiene (24.9 g) was added thereto. Furthermore, to the mixture were added a solution of triethylaluminum (1 mmol/ml) in toluene (0.4 ml), a fixed amount of a toluene solution of one (1 mmol/ml) of the halogencontaining organic compounds as mentioned in Table 1, in order. Then, the bottle was stoppered and shaken on constant temperature water bath at 40°C for a prescribed period to subject the mixture to polymerization reaction. After the polymerization reaction, a solution of t-butylcatechol (2 g/l) in methanol (20 ml) was added to the reaction mixture for stopping the reaction. The mixture was distilled under a reduced pressure to remove unreacted butadiene, toluene, methanol and additives until there was observed no absorption of any aromatic compound by infrared spectrum.

The test results of the liquid polybutadiene thus obtained are shown in Table 1.

Table 1

| Test No. | Halogen-containing compound | | Polymerization period | Polymerization product | | | | |
|---|---|---|---|---|---|---|---|---|
| | | | | Yield | | [η] | Micro structure (%) | | |
| | Kind | Amount (mmol) | (hr.) | (g) | (%) | (dl/g) | Cis-1,4 | Vinyl | Trans-1,4 |
| 1* | — | — | 5 | 0 | 0 | — | — | — | — |
| 2 | Carbon tetrachloride | 0.4 | 5 | 10.5 | 42.1 | 0.13 | — | — | — |
| 3 | Carbon tetrachloride | 4.0 | 5 | 11.2 | 45.0 | 0.13 | 75.6 | 1.9 | 22.5 |
| 4 | 5-Chloronorbornene | 6.0 | 5 | 25.1 | 100 | 0.12 | — | — | — |

EXAMPLE 2

In the same manner as described in Example 1, the polymerization was carried out except that benzotrihalogenide was used as the halogen-containing organic compound. The benzotrihalogenide was used in a toluene solution (concentration: 1 mmol/ml). Thee test results are shown in Table 2.

Table 2

| Test No. | Halogen-containing compound Kind | Amount (mmol) | Polymerization period (hr.) | Yield (g) | Yield (%) | [η] (dl/g) | Polymerization product Micro-structure (%) Cis-1,4 | Vinyl | Trans-1,4 | Medium molecular weight |
|---|---|---|---|---|---|---|---|---|---|---|
| 1* | — | — | 5 | 0 | 0 | — | — | — | — | — |
| 2 | Benzotrichloride | 0.4 | 3 | 24.3 | 97.6 | 0.35 | — | — | — | — |
| 3 | Benzotrichloride | 4.0 | 3 | 21.6 | 86.8 | 0.081 | 75.1 | 3.3 | 21.6 | 1400 |

[Note]: *Halogenated hydrocarbon was not used.

EXAMPLE 3

One liter stainless steel autoclave provided with an anchor type stirrer, in which air was replaced by nitrogen, was cooled at −15°C, and thereto were added in nitrogen stream a solution of nickel capronate (0.02 m-mol/ml) in toluene (8 ml), anhydrous toluene (65 ml), liquefied butadiene (125 g), liquefied butene-1 (120 g), a solution of triethylaluminum (1 mol/l) in toluene (2 ml) and a solution of benzotrichloride (1 mol/l) in toluene (10 ml), in order. After sealing the autoclave, the mixture was stirred at 40°C for 3 hours to subject it to polymerization reaction. After the polymerization reaction, methanol (50 ml) containing a stabilizer was added to the reaction mixture for stopping the reaction, and then the mixture was distilled under a reduced pressure to remove methanol, toluene and the like.

Thus, the desired liquid polybutadiene (125 g) was obtained. The product had the micro structure of cis-1,4 (76.1 percent), vinyl (1.9 percent) and trans-1,4 (22 percent), and had intrinsic viscosity [η]: 0.080 dl/g.

EXAMPLE 4

Into a 200 ml glass made pressure polymerization vessel was added a solution of nickel naphthenate (0.02 mmol/ml) in toluene (1.5 ml) in nitrogen stream, and thereto were added anhydrous benzene (100 ml) and liquefied butadiene (24.9 g), in order. To the mixture were further added a solution of diethylaluminum fluoride (1 mmol/ml) in benzene (0.3 ml) and a solution of propargyl bormide (1 mmol/ml) in benzene (3 ml), in order. The reaction vessel was stoppered and shaken on constant temperature water bath at 40°C for 5 hours to subject the mixture to polymerization reaction. The reaction mixture was treated in the same manner as described in Example 1 to give liquid polybutadiene (25.0 g). The product had intrinsic viscosity [η]: 0.021 dl/g and medium molecular weight: 394. When the viscosity of the product was measured at 30°C by a falling-ball viscometer, it was 107 cps.

EXAMPLE 5

Into a 200 ml pressure polymerization vessel was added a solution of nickel naphthenate (0.01 mmol/ml) in benzene (4 ml) in nitrogen stream, and thereto were further added anhydrous benzene (80 ml), liquefied butadiene (25 g), a solution of triethylaluminum (1 mmol/ml) in benzene (0.4 ml) and a solution of hexachloroacetone (0.1 mmol/ml) in benzene (2.4 ml), in order. The vessel was sealed and then shaken on constant temperature water bath at 40°C for 5 hours to subject the mixture to polymerization reaction. After the polymerization reaction, the reaction mixture was treated in the same manner as described in Example 1 to give liquid polybutadiene (18.6 g).

The product had intrinsic viscosity [η]: 0.111 dl/g and the micro structure of cis-1,4 (76.3 percent), vinyl (1.6 percent) and trans-1,4 (22.1 percent).

EXAMPLE 6

Into a 200 ml pressure polymerization vessel were added in nitrogen stream a solution of diethylaluminum fluoride (0.8 mmol) in toluene (1.6 ml), anhydrous toluene (70 ml), a solution of hexachloroacetone (0.3 mmol) in toluene (1.5 ml), anhydrous butadiene (22 g) and a solution of nickel stearate (0.04 mmol) in toluene (1 ml), in order. After stoppering the vessel, the mixture was heated at 50°C for 3 hours to subject it to polymerization reaction. After the polymerization reaction, the reaction mixture was treated in the same manner as described in Example 1 to give low molecular weight polybutadiene (20.3 g). The product had a viscosity of 4830 cps (molecular weight: 5200) at 30°C and the micro structure of cis-1,4 (78.5 percent), vinyl (1.3 percent) and trans-1,4 (20.2 percent). No gelation was observed in the polymer by measurement of the gel ratio.

EXAMPLE 7

Into a 200 ml pressure polymerization vessel were added in nitrogen stream a solution of diethylaluminum fluoride (0.8 mmol) in toluene (1.6 ml), a solution of benzotrichloride (0.28 mmol) in toluene (0.56 ml), anhydrous toluene (57 ml), anhydrous butadiene (liquefied butadiene at −78°C: 22 g) and a solution of nickel naphthenate (0.04 mmol) in toluene (1 ml), in order. The vessel was stoppered and then heated at 50°C for 3 hours to subject the mixture to polymerization reaction. After the polymerization reaction, the mixture was treated in the same manner as described in Example 1 to give low molecular weight polybutadiene (20.7 g: 94.1 %). The product had viscosity of 7833 cps at 30°C and the micro structure of cis-1,4 (83.3 percent), vinyl (1.8 percent) and trans-1,4 (8.4 percent). The gel ratio of the product was 0.

What is claimed is:

1. A process for producing liquid polybutadiene having a predominantly cis-1,4-structure, which comprises polymerizing 1,3-butadiene in the presence of a catalyst system comprising
   1. an organic aluminum compound of the formula: $AlR_1R_2R_3$ wherein $R_1$ is hydrogen, fluorine, alkyl, cycloalkyl, aryl or aralkyl and in which $R_2$ and $R_3$ are each alkyl, cycloalkyl, aryl or aralkyl;
   2. at least one of nickel compound selected from the group consisting of
      a. a nickel salt of a carboxylic acid,
      b. an organic nickel complex compound selected from the group consisting of a complex of nickel chloride and pyridine, tris(dipyridine).nickel chloride, bis(ethylenediamine). nickel sulfate, bis(acetyl acetonat).nickel, bis(ethyl acetoacetate).nickel and bis(dimethyl glyoximate).nickel,
      c. Nickel tetracarbonyl, and
      d. π-bond type organic nickel compound selected from the group consisting of bis(π-allyl) nickel, bis (π-methallyl)nickel, bis (π-crotyl)nickel, bis(π-cyclooctenyl)nickel and bis(π-cyclopentenyl)nickel; and
   3. at least one halogen-containing organic compound selected from the group consisting of
      a. a halogen norbornene selected from the group consisting of 5-chloronorbornene, 5-chloromethylnorbornene, 5-bromonorbornene and 5-bromomethylnorbornene,
      b. a benzotrihalogenide,
      c. an alkynyl halogenide, and
      d. a ketone compound containing chlorine or bromine in the molecule,
   the organic aluminum compound being used in an amount of 0.0001 to 0.1 mole on the basis of one mole of butadiene monomer, the nickel compound being used in an amount of 0.01 to 0.6 mole on the basis of one mole of the organic aluminum compound and the halogencontaining organic compound being used in an amount of 0.05 to 100 mole on the basis of one mole of the organic aluminum compound, the organic aluminum compound and the halogen-containing compound being added to the reaction system after the addition of 1,3-butadiene.

2. The process according to claim 1, wherein the polymerization reaction is carried out in an inert solvent selected from aliphatic, alicyclic and aromatic hydrocarbons having 4 to 12 carbon atoms in an amount of 0.3 to 10 times of the amount of butadiene monomer.

3. The process according to claim 2, wherein said inert solvent is selected from the group consisting of butane, butene-1, butene-2, pentane, heptane, cyclohexane, benzene, toluene, xylene, and mixtures thereof.

4. The process according to claim 3, wherein the inert solvent is used in an amount of about 0.5 to 3 times the amount of butadiene monomer.

5. The process according to claim 1, wherein the polymerization is carried out in an atmosphere of an inert gas at a temperature of 0° to 100°C.

6. The process according to claim 5, wherein polymerization is carried out at a temperature of about 20° to 60°C under a pressure of about 1 to 10 atmospheres.

7. The process according to claim 1, wherein the organic aluminum compound is a member selected from the group consisting of diethylaluminum hydride, di-n-propylaluminum hydride, di-n-butylaluminum hydride, diisobutylaluminum hydride, diphenylaluminum hydride, phenylethylaluminum hydride, dibenzylaluminum hydride, phenyl-n-propylaluminum hydride, p-tolylisopropylaluminum hydride, trimethylaluminum, triethylaluminum, tri-n-propylaluminum, triisopropylaluminum, tri-n-butylaluminum, triisobutylaluminum, tripentylaluminum, tricyclohexylaluminum, triphenylaluminum, diethylaluminum fluoride, di-n-propylaluminum fluoride, di-n-butylaluminum fluoride, di-isobutylaluminum fluoride, dihexylaluminum fluoride, dioctylaluminum fluoride and diphenylaluminum fluoride.

8. The process according to claim 1, wherein the haolgen-containing organic compound is a member selected from the group consisting of 5-chloronorbornene, 5-chloromethylnorbornene, 5-bromonorbornene, 5-bromoethylnorbornene, benzotrichloride, 2,4-dichlorobenzotrichloride, benzotribromide, propargyl chloride, propargyl bromide, 1,3-dichloroacetone, 1,1,3,3-tetrachloroacetone, bromoacetone, 1,3-dibromoacetone and hexachloroacetone.

9. The process according to claim 1, wherein said halogenated norbornene is selected from the group consisting of 5-chloronorbornene, 5-chloromethylnorbornene, 5-bromonorbornene and 5-bromomethylnorbornene.

10. The process according to claim 1, wherein said organic aluminum compound is trialkyl aluminum.

11. The process according to claim 10, wherein said trialkyl aluminum is triethyl aluminum.

12. The process according to claim 1, wherein $R_1$ is fluorine.

13. The process according to claim 12, wherein polymerization is continued until the liquid polybutadiene has an average molecular weight of at least about 4,000.

14. The process according to claim 1, wherein said nickel salt of a carboxylic acid is selected from the group consisting of nickel acetate, nickel naphthenate, nickel octate, and nickel benzoate.

15. The process according to claim 1, wherein said benzotrihalogenide is selected from the group consisting of benzotrichloride, 2,4-dichlorobenzotrichloride and benzotribromide.

16. The process according to claim 1, wherein said alkynyl halogenide is selected from the group consisting of propargyl chloride and propargyl bromide.

17. The process according to claim 1, wherein said ketone compound containing chlorine or bromine is selected from the group consisting of 1,3-dichloroacetone, 1,1,3,3-tetrachloroacetone, bromoacetone, 1,3-dibromoacetone and hexachloroacetone.

18. The process according to claim 1, wherein the organic aluminum compound is used in an amount of 0.0001 to 0.01 mole on the basis of 1 mole of butadiene monomer.

19. The process according to claim 1, wherein the nickel compound is used in an amount of 0.05 to 0.25 mole on the basis of one mole of the organic aluminum compound.

20. The process according to claim 1, wherein the halogencontaining organic compound is used in an amount of 0.2 to 20 mole on the basis of one mole of the organic aluminum compound.

21. The process according to claim 1, wherein the organic aluminum compound is used in an amount of about 0.0001 to 0.01 mole on the basis of one mole of butadiene monomer, the nickel compound is used in an amount of 0.05 to 0.25 mole on the basis of one mole of the organic aluminum compound, and the halogen-containing organic compound is used in an amount of about 0.2 to 20 mole on the basis of one mole of organic aluminum compound.

22. The process according to claim 1, wherein said catalyst system consists essentially of said organic aluminum compound, said at least one nickel compound and said at least one halogencontaining organic compound.

23. The process according to claim 22, wherein said catalyst system consists of said organic aluminum compound, said at least one nickel compound and said at least one halogen-containing organic compound.

24. The process according to claim 1, wherein polymerizing is accomplished at a temperature of about 20° to 60°C, and further wherein said catalyst system consists essentially of said organic aluminum compound, said at least one nickel compound and said at least one halogen-containing organic compound.

25. The process according to claim 24, wherein said catalyst system consists of said organic aluminum compound, said at least one nickel compound and said at least one halogen-containing organic compound.

26. The process according to claim 1, wherein said organic aluminum compound is selected from the group consisting of trialkyl aluminum and dialkyl aluminum fluoride.

* * * * *